US008408365B2

(12) United States Patent
Biasiotto et al.

(10) Patent No.: US 8,408,365 B2
(45) Date of Patent: Apr. 2, 2013

(54) LOCKING DEVICE FOR PREVENTING A ROTATION AND/OR AN AXIAL MOVEMENT OF A PIN, INCLUDING SHAPE MEMORY RELEASING MEANS

(75) Inventors: Marco Biasiotto, Orbassano (IT); Stefano Alacqua, Orbassano (IT); Gianluca Capretti, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 1345 days.

(21) Appl. No.: 12/127,624

(22) Filed: May 27, 2008

(65) Prior Publication Data

US 2009/0009026 A1 Jan. 8, 2009

(30) Foreign Application Priority Data

Jul. 6, 2007 (EP) ..................................... 07425421

(51) Int. Cl.
*B65H 59/10* (2006.01)
(52) U.S. Cl. ....................................... 188/67; 188/77 W
(58) Field of Classification Search ............... 188/77 W; 310/306
See application file for complete search history.

(56) References Cited

U.S. PATENT DOCUMENTS

| | | | | |
|---|---|---|---|---|
| 3,874,480 A | * | 4/1975 | Porter et al. ..................... | 188/67 |
| 4,257,497 A | * | 3/1981 | Schroeder ................... | 188/77 W |
| 4,411,339 A | * | 10/1983 | Porter .............................. | 188/67 |
| 4,526,047 A | * | 7/1985 | Yang ................................... | 74/25 |
| 4,577,730 A | * | 3/1986 | Porter .............................. | 188/67 |
| 4,991,675 A | * | 2/1991 | Tosconi et al. ............. | 180/69.21 |
| 5,010,983 A | * | 4/1991 | Kitamura ......................... | 188/67 |
| 5,150,771 A | * | 9/1992 | Porter .............................. | 188/67 |
| 5,771,742 A | * | 6/1998 | Bokaie et al. ....................... | 74/2 |
| 5,794,470 A | * | 8/1998 | Stringer .......................... | 188/67 |
| 5,819,881 A | * | 10/1998 | Stringer .......................... | 188/67 |
| 6,164,419 A | * | 12/2000 | Tribbett .......................... | 188/67 |
| 6,454,775 B1 | * | 9/2002 | Demarais et al. ............. | 606/128 |
| 6,732,516 B2 | * | 5/2004 | Butera et al. .................... | 60/527 |
| 7,216,840 B2 | * | 5/2007 | Fang .............................. | 248/425 |
| 7,764,159 B2 | * | 7/2010 | Zanella et al. ................. | 337/140 |

(Continued)

FOREIGN PATENT DOCUMENTS

| | | |
|---|---|---|
| GB | 2078846 A | 1/1982 |
| WO | 2005005828 A2 | 1/2005 |

OTHER PUBLICATIONS

European Search Report from corresponding European Patent Application No. 07425421.0, dated Nov. 22, 2007.

*Primary Examiner* — Robert A Siconolfi
*Assistant Examiner* — James Hsiao
(74) *Attorney, Agent, or Firm* — Heslin Rothenberg Farley & Mesiti P C; Victor A. Cardona, Esq.

(57) ABSTRACT

A locking device for preventing the rotation and/or the axial movement of a pin includes a coil spring wound around at least a portion of the pin and having one end rigidly connected to a support structure. In its undeformed condition, the spring has an internal diameter smaller than the diameter of the pin, whereby in its resting condition the spring is tightened around the pin to prevent a rotation thereof at least in a direction or an axial movement in any direction. The device includes shape memory means for causing the unwinding of the turns of the spring for the purpose of temporarily releasing the pin.

10 Claims, 8 Drawing Sheets

U.S. PATENT DOCUMENTS

| | | | |
|---|---|---|---|
| 7,810,852 B2 * | 10/2010 | Alacqua et al. | 292/201 |
| 7,931,337 B2 * | 4/2011 | Lawall et al. | 297/354.12 |
| 8,117,938 B2 * | 2/2012 | Mitteer | 74/473.23 |
| 2003/0106761 A1 | 6/2003 | Taylor | |
| 2003/0226725 A1 * | 12/2003 | Allen et al. | 188/67 |
| 2004/0099491 A1 * | 5/2004 | Stevenson et al. | 188/77 W |
| 2004/0144604 A1 * | 7/2004 | Doornbos et al. | 188/290 |

\* cited by examiner

LOCKING DEVICE FOR PREVENTING A ROTATION AND/OR AN AXIAL MOVEMENT OF A PIN, INCLUDING SHAPE MEMORY RELEASING MEANS

CROSS REFERENCE TO RELATED APPLICATIONS

This application claims priority from European patent application No. 07425421.0, filed on Jul. 6, 2007, the entire disclosure of which is incorporated herein by reference.

BACKGROUND OF THE INVENTION

The present invention relates to locking devices for preventing the rotation and/or the axial movement of a pin, of the type including a coil spring wound around at least a portion of the pin. In devices of this type, the aforesaid spring has one end rigidly connected to a support structure. In the undeformed condition, the spring has an internal diameter lower than the diameter of the pin, whereby in its rest condition, it is tightened around the pin such as to prevent a rotation thereof at least in one direction and/or an axial movement in any direction. In case of devices of this type, means are further provided for causing unwinding of the turns of the spring, for the purpose of temporarily releasing the device, enabling a rotation and/or an axial movement of the pin.

A device of the above indicated type is described, for example, in GB-A-2 078 846.

SUMMARY OF THE INVENTION

The object of the present invention is to provide a device of this type which is simpler and more efficient with respect to the known devices.

A further object of the present invention is to provide a device of the above specified type which has releasing means which are also suitable to be arranged for an electric actuation, without for this reason involving a complicated and/or cumbersome and/or expensive structure.

A further object of the invention is to provide a device of the above specified type which is particularly suitable for being used on articulation pins of movable parts, such as in applications on-board of vehicles the articulation pin of a lid in the compartment, such as an articulated lid on the dashboard or a lid on an armrest, or still for a door of a refueling inlet of a fuel tank, or also, for example, on the articulation pin of a sun-shade on the vehicle or a lid on the sun-shade.

These and other objects are attained, according to the invention, due to that the aforesaid means for causing the unwinding of the spring turns are shape memory actuating means.

In a preferred embodiment of the invention, the aforesaid shape memory means for causing the unwinding of the spring turns are electrically operable.

Also in the case of the aforesaid embodiment, the shape memory means consist of a shape memory wire arranged through an axial hole of the aforesaid pin and having one end connected to the pin and the opposite end connected with an axially slidable actuating element, for causing the unwinding of the spring turns, said shape memory wire having a transition temperature above which it undergoes a reduction in length, so as to cause the displacement of said axially slidable element to a position which causes the unwinding of the turns of the spring.

Also in the case of such embodiment, the end of the aforesaid spring which is opposite to the end connected to the support structure is connected to a shank radially extending towards the outside, which engages a helical slit formed in a tubular cylindrical wall forming part of said slidable actuating element. In this way, the sliding movement of the actuating element causes a rotation of the aforesaid end shank of the spring in the direction which determines an unwinding of the spring turns.

Naturally, the shape memory means could also be provided in a different form, for example in form of a wound wire-actuator, according to what has been proposed in the previous European Patent Application EP06425135 of the same Applicant (still secret at the filing date of this application).

Shape memory materials have been studied and used since long. The same Applicant is the owner of various patents on different applications of these materials to various devices, above all in the automotive field. They typically consist of nickel and titanium metal alloys which present the property of changing from a martensitic phase to an austenitic phase above a transition temperature.

In the case of the present invention, such transition temperature is arranged to a value higher than the ambient temperature value. Also in the case of the preferred embodiment, the heating of the shape memory material beyond the transition temperature is obtained electrically, by supplying an electric current through the shape memory material, so as to heat it by Joule effect. However, the use is not excluded of shape memory elements in which the passage beyond the transition temperature takes place due to direct heat application, when the temperature at which the above device is operating increases.

As already disclosed above, the device according to the invention, in the embodiments which are illustrated herein by way of example, is typically intended for being used for locking and releasing hinged members in which the torques at stake are not particularly remarkable. For example, the device according to the invention can be associated to an articulation pin of an articulated lid within a vehicle compartment, for example a lid of a compartment on a vehicle dashboard, or a lid on an armrest or a central console in the vehicle compartment. A further application is the lid of the refueling inlet to the fuel tank or also the articulation pin of a sun-shade. All the aforesaid components typically have an articulation pin which could be locked, for holding the articulated member in a closed condition against a cooperating support, and temporarily released, for enabling an oscillation of the hinged member from its closed position to its opened position (or to its deployed position in case of a sun-shade).

BRIEF DESCRIPTION OF THE DRAWINGS

Further features and advantages of the invention will appear from the following description with reference to the annexed drawings, given by mere way of not limiting example, in which.

DETAILED DESCRIPTION OF THE INVENTION

Figure 1:
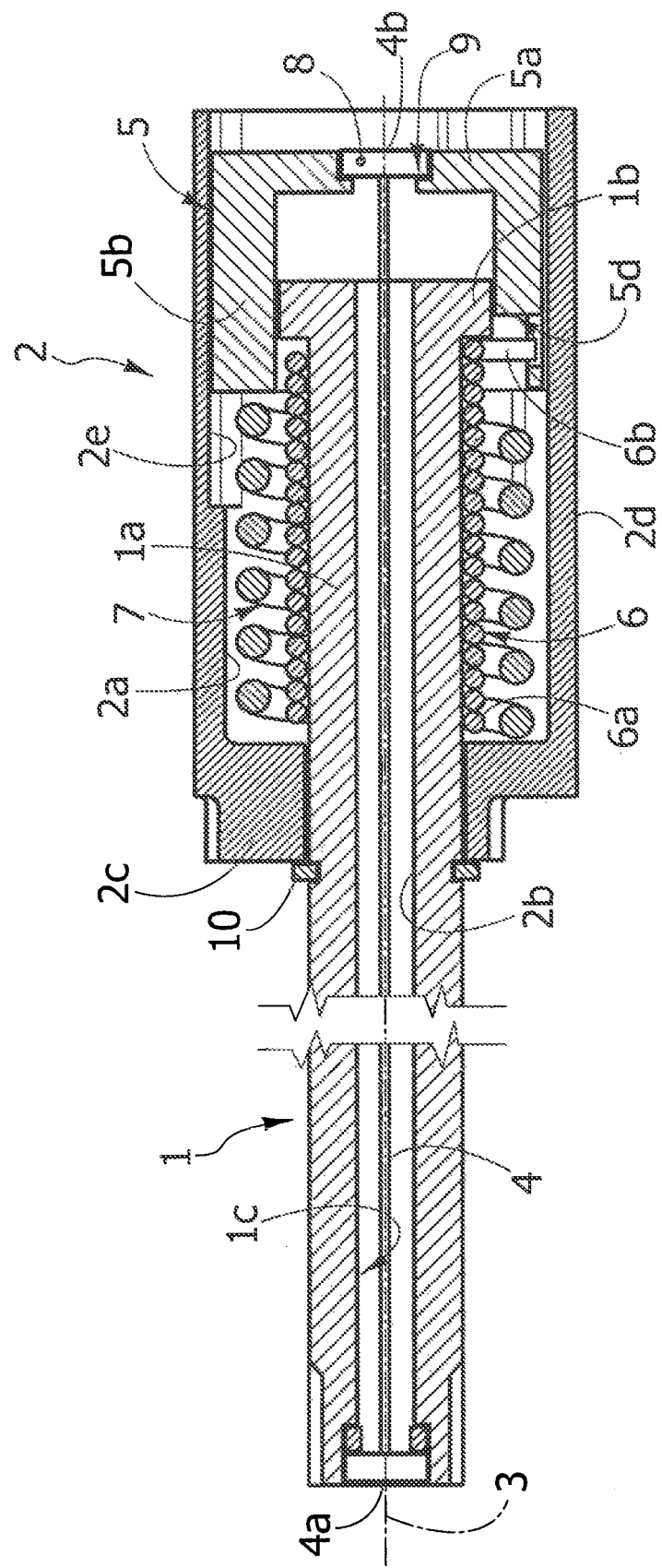
FIGS. 1, 2 are a sectional view and an exploded perspective view of a preferred embodiment of the device according to the invention.

With reference to the drawings, numeral 1 generally designates a pin, having an end portion 1a which is contained within the cylindrical cavity 2a of a casing 2 in form of a cup-like cylindrical member. The pin 1 is rotatably supported by the wall of a cylindrical hole 2b formed in an end wall 2c of the casing 2. The casing 2 is intended for being mounted on a fixed structure, and the pin 1, which is thus rotatable around its axis 3 relative to the casing 2, can be rigidly connected to an oscillating element, such as for example an articulated lid or a sun-shade, on-board of a vehicle.

Figure 2:
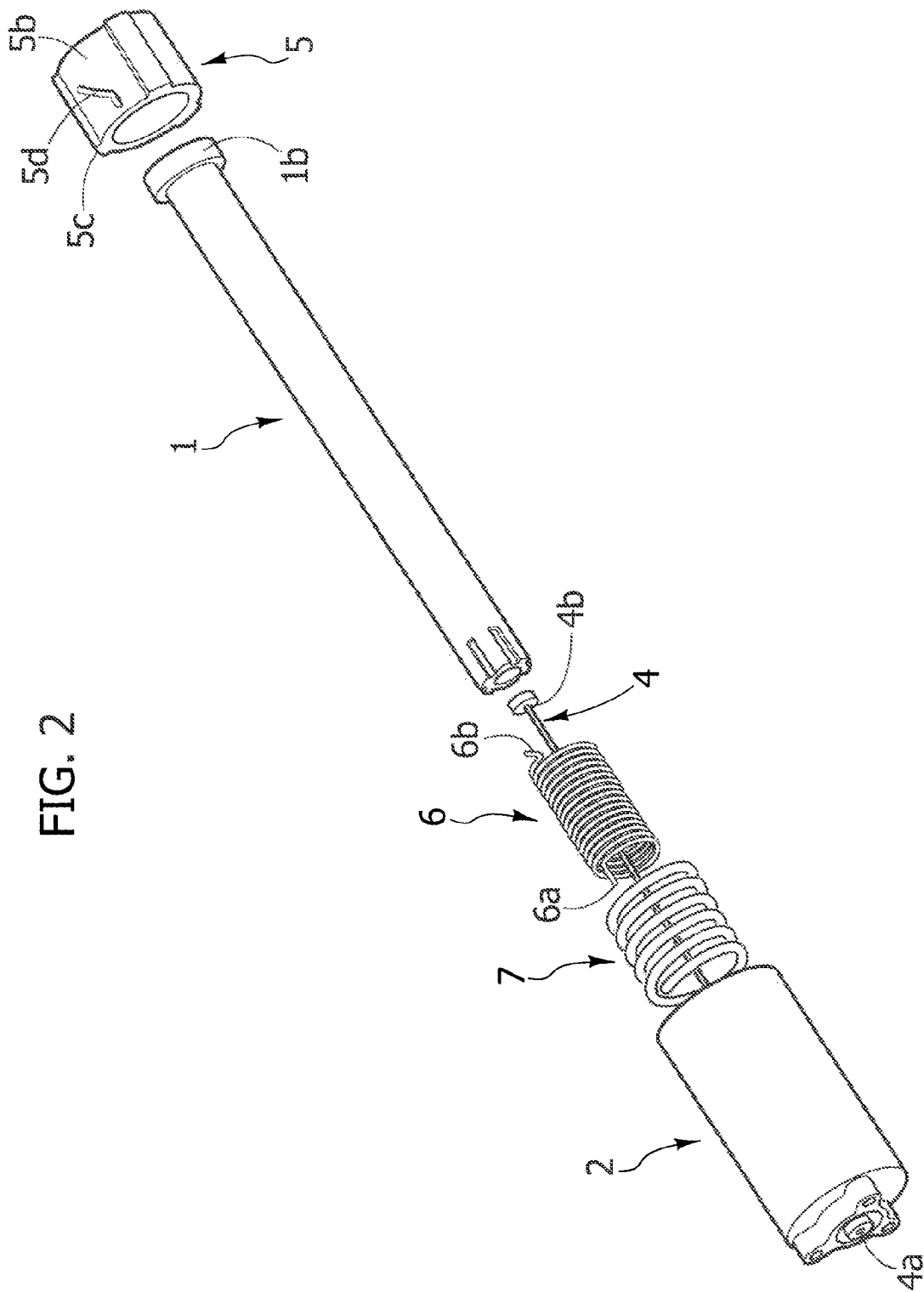

The pin 1 consists of a tubular-shaped member, with a substantially uniform diameter and having an end collar 1b with an enlarged diameter. Through the axial cavity 1c of the pin 1, along the axis 3, a wire 4 made of a shape memory alloy is arranged. One end 4a of the shape memory wire 4 is axially fixed to the end of the tubular pin 1 at the opposite side with respect to the collar 1b. A member 11, for example a ring made of a material having a low coefficient of friction is interposed between this end 4a of the shape memory wire and the tubular pin 1, for enabling the relative rotation between the pin 1 and the shape memory wire 4, thus preventing torsion stresses on the wire. The opposite end 4b of the shape memory wire 4 is rigidly connected to an actuating element 5 which, in the example shown, also has a cup-shaped body, with a bottom wall 5a to which the end 4b of the shape memory wire 4 is fixed, and a cylindrical skirt 5b which is slidably mounted within the cylindrical wall 2d of the casing 2 and above the collar 1b of the pin 1. The actuating element 5 further has axial ribs 5c on its external surface (FIG. 2) which are received within axial cavities 2e formed on the internal surface of the cylindrical wall 2d of the casing 2. The prismatic engagement of the ribs 5c within the cavities 2e prevents a rotation of the actuating element 5 around the axis 3 relative to the casing 2, leaving on the contrary the actuating element 5 free to axially slide in the direction of the axis 3 with respect to the casing 2 and with respect to the pin 1.

On the portion 1a of the pin 1 which is arranged within the cavity 2a of the casing 2 a coil spring 6 is wound, having one end 6a rigidly connected to the casing 2. The spring 6 is shaped such that, in its free and not deformed condition, it shows an internal diameter slightly lower than the outer diameter of the pin 1. Therefore, in the resting condition illustrated in FIG. 1, the turns of the spring 6 are tightly wound around the pin 1 and therefore lock such pin by friction both against an axial movement and against a rotation in the direction causing winding of the spring turns.

The end of the spring 6 opposite to the end 6a forms a radial shank 6b which engages a helical slit 5d formed in the cylindrical skirt 5b of the actuating element 5.

Finally, within the cavity 2a of the cylindrical casing 2 a coil spring 7 is coaxially arranged, having one end abutting against the internal surface of the bottom wall 2c and the opposite end contacting the actuating element 5b so as to push it towards the resting position shown in FIG. 1, defined by the contact between a disk 8 integral with the end 4b of the wire 4 and a shoulder 9 defined by the surface of a central hole formed in the bottom wall 5a of the slidable actuating element 5.

The operation of the device above described is the following.

In the resting condition, as already shown above, the turns of the spring 6 are tightly wound around the portion 1a of the pin 1, so as to lock such pin, in particular with respect to a rotation movement apt to further wound the turns of the spring 6. Such condition can be exploited, for example, for maintaining in a closed locked condition an articulated lid on a vehicle, as the spring 6 prevents a rotation of the lid in the opening direction, while the surface of the cooperating support which receives the lid in the closed condition prevents a rotation of the lid in the opposite direction.

Starting from the aforesaid resting condition, should the temperature of the shape memory wire 4 exceed the transition value of such shape memory element, this latter is subjected to a reduction in length, whereby the end 4b fixed to the slidable element 5 moves closer to the end 4a, determining a leftward sliding movement (with reference to FIG. 1) of the slidable element 5 with respect to the casing 2 and with respect to the pin 1, against the action of the spring 7.

When the shape memory wire 4 is operated, a resilient ring 10, mounted above the pin 1 and abutting against the outer surface of the end wall 2c of the casing 2, prevents a relative movement of the pin 1 with respect to the casing 2 in the direction which would move the end 4a of the wire 4 towards the casing 2.

The sliding of the element 5 determines a rotation of the shank 6b around the axis 3, due to the engagement of such shank within the helical slit 5d, in the direction apt to unwind the turns 6 of the spring. In such condition, therefore, the turns of the spring 6 become loose and the locking action by friction of the pin is temporarily interrupted. In such condition, therefore, the pin 1 can be rotated, for example for moving the lid connected thereto towards the opening condition or for moving a sun-shade connected thereto towards the deployed condition.

When the temperature of the shape memory wire 4 returns below the transition temperature, the wire 4 returns to its longer configuration and the actuating element 5 returns to its starting position, under the force of the spring 7. In this way, the turns of the spring 6 are tightened again around the pin 1 by locking it against the rotation.

Figure 3:
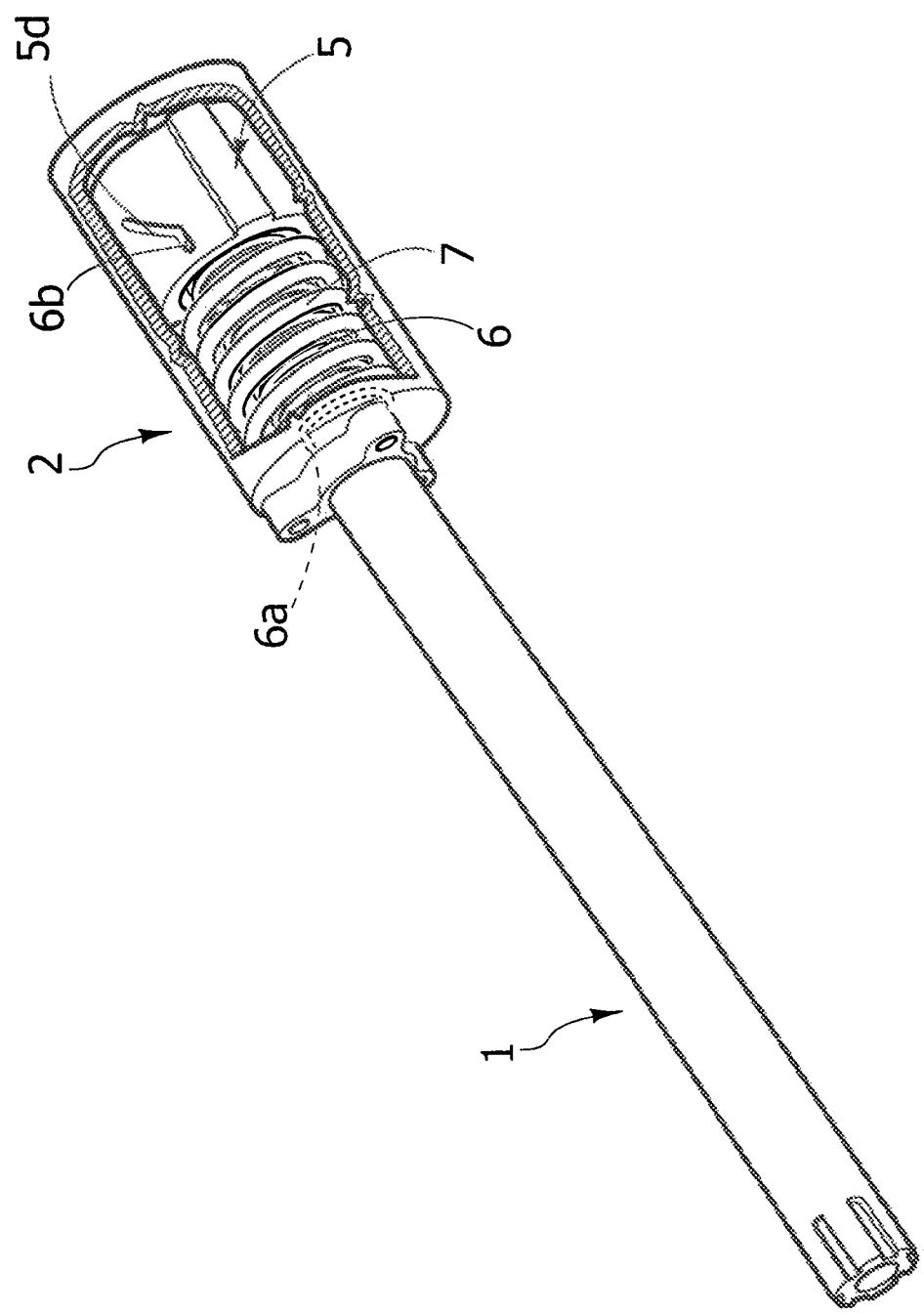
FIGS. 3, 4 are perspective views at an enlarged scale of a particular of the device of FIGS. 1, 2, in two different working conditions.
Figure 4:
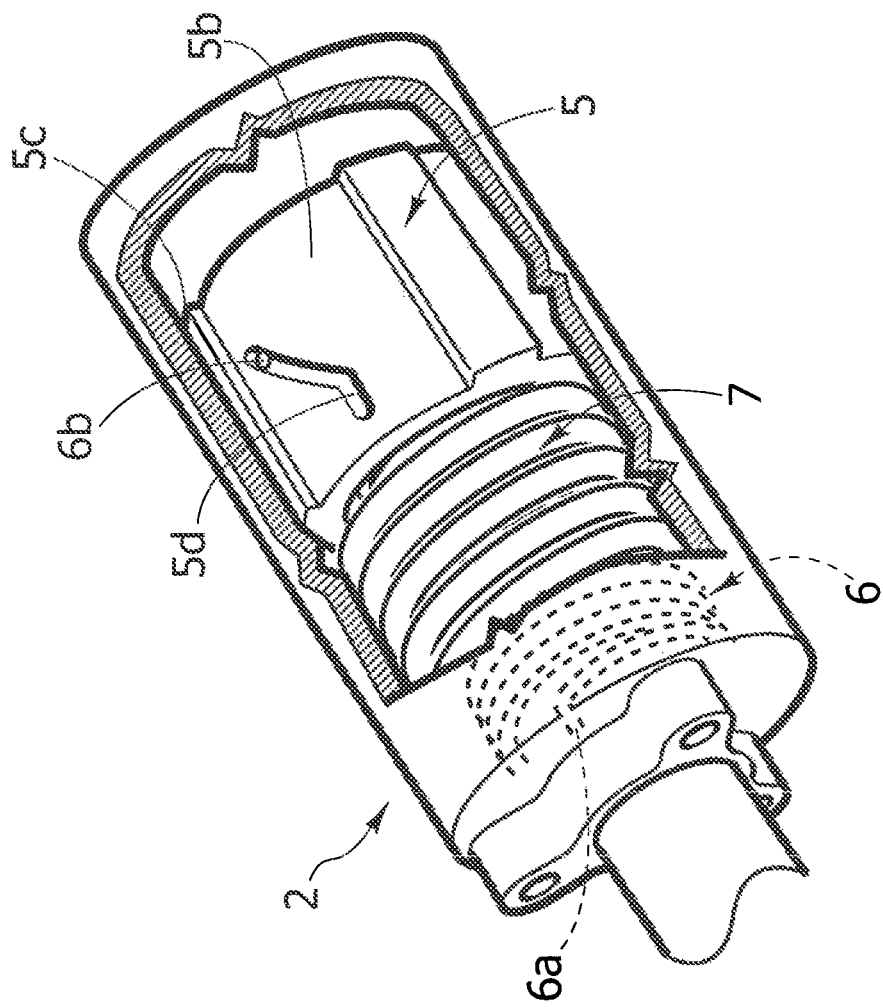
Figure 5:
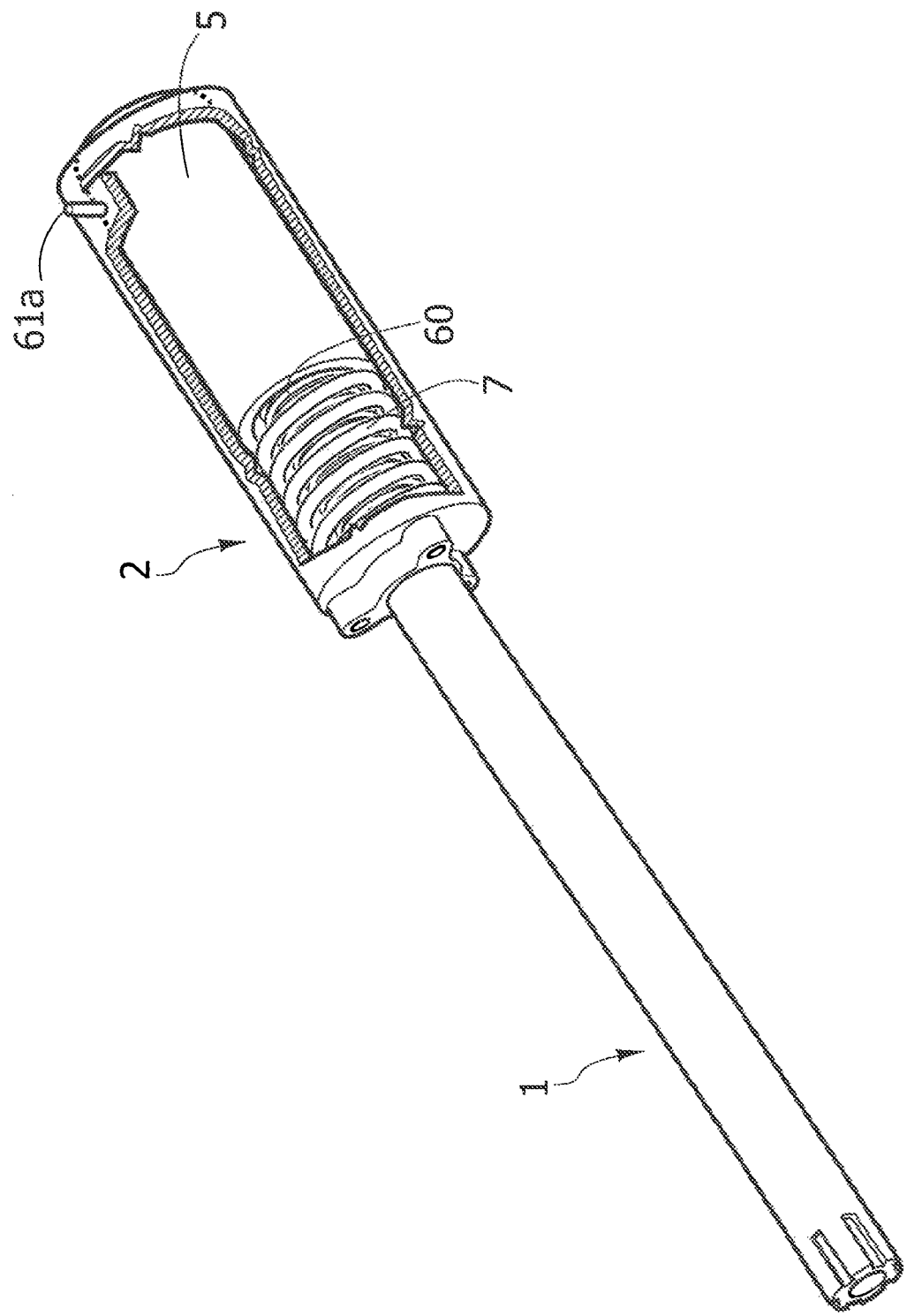
FIGS. 5-8 show a variant, respectively in a perspective view, in an additional simplified perspective view, in a partly sectioned perspective view and in a side view which shows the device with the casing removed.
Figure 6:
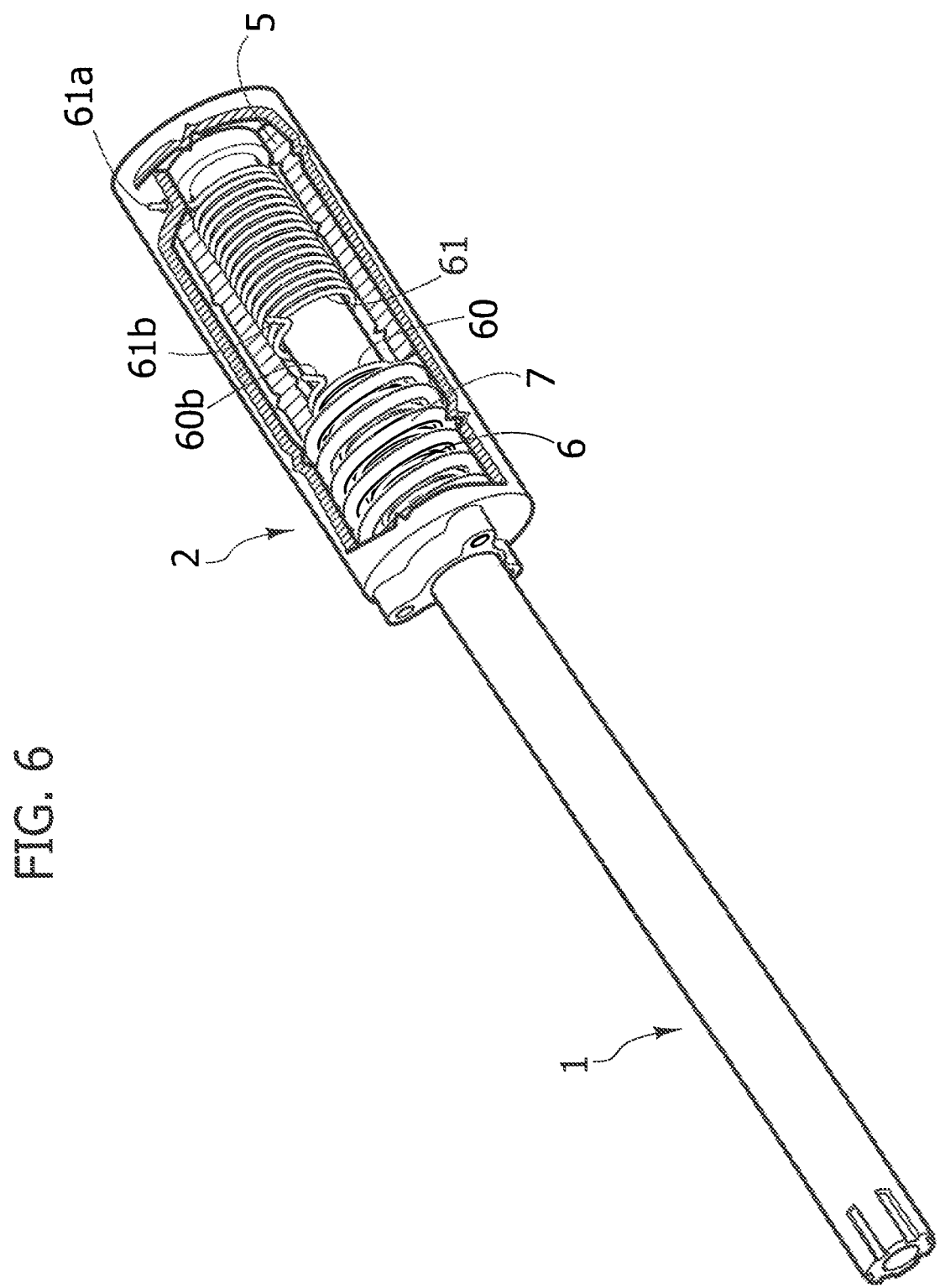
Figure 7:
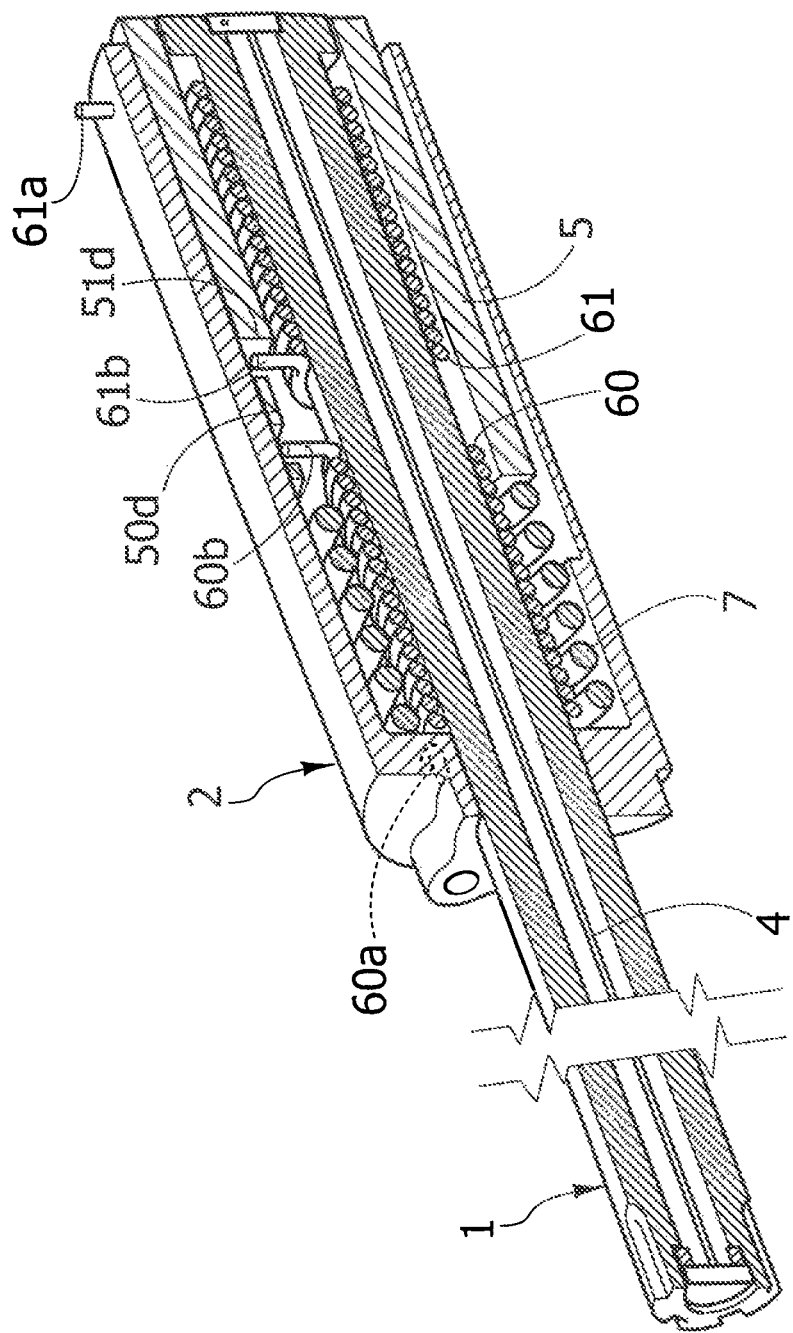
Figure 8:
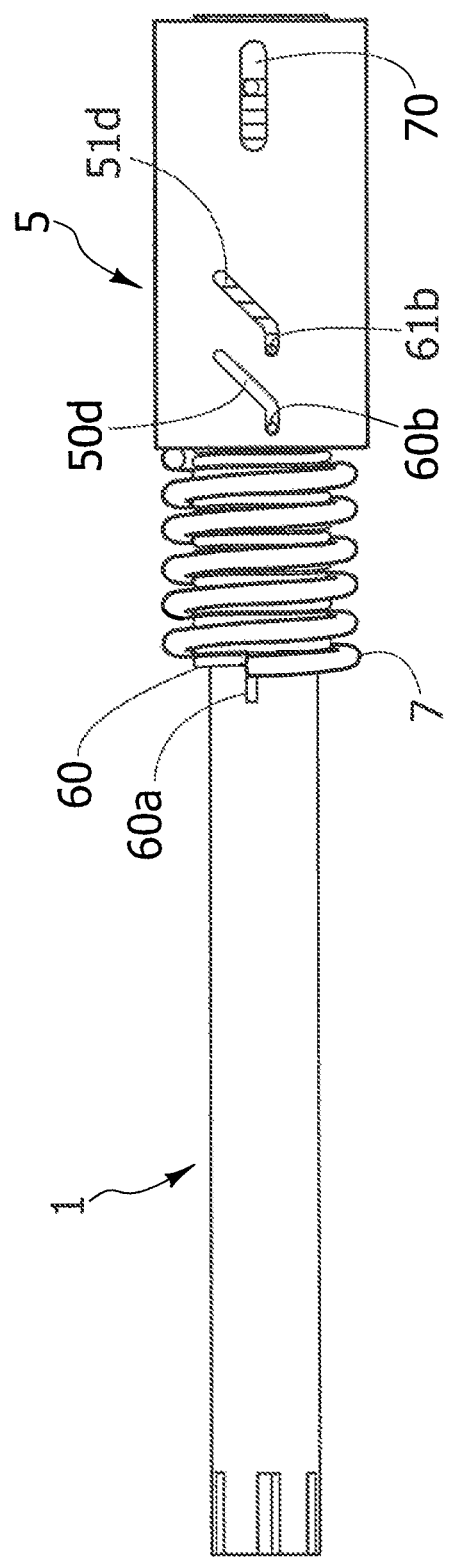

FIGS. 3, 4 show at an enlarged scale the resting position and the operating position of the element 5.

The activation of the shape memory wire 4 can be obtained electrically, by supplying an electric current through the wire 4, by means of a connection (not shown) of the ends of the wire 4 to an electric supply through an electronic control unit which provides for activating and interrupting the electric supply as a function of a control signal imparted by the user.

Naturally, without prejudice to the principle of the invention, the construction details and the embodiments could widely vary with respect to what has been described and shown by mere way of example.

It is thus possible to provide shape memory means for the release of the locking device formed in a completely different way from the one illustrated herein by way of example. In particular, it is possible to use a shape memory element formed as a wound wire or band, according to what has been proposed in the above mentioned European patent application of the same Applicant, which is able to directly impart a rotation to the spring si as to unwind the turns thereof, with an extremely reduced bulk. Likewise, the device according to the invention can be arranged for locking the pin against axial movements, in applications in which the pin is connected to movable elements which drive an axial movement of the pin.

In order to obtain the locking of the pin 1 in both directions of rotation, a couple of coil springs 60 and 61, with an opposite winding direction of their turns, can be used, instead of the single coil spring 6 (see FIGS. 5-8). In this case, both the springs will have one end, 60a and 61a, respectively, rigidly connected to the support structure 2 and an opposite end in form of a radial shank, 60b and 61b, engaged within a helical slit 50d and 51d of the slidable actuating element 5, the slit being formed such that an axial movement of said slidable actuating element 5 causes a rotation of said shanks 60b and 61b around the axis 3 of the pin 1, tending to unwind the turns of both the coil springs 60 and 61. Besides being fixed to the structure 2, the shank 61a is engaged through a slot 70 of the element 5, to avoid an interference with the axial movement of the latter.

Finally, various advantageous applications of the device according to the invention are possible, also different from those mentioned herein by mere way of example.

What is claimed is:

1. A locking device for preventing the rotation and/or the axial movement of a pin, including at least a coil spring wound around a portion of said pin and having one end rigidly connected to a support structure, said spring having, in its undeformed condition, an internal diameter smaller than the diameter of said pin, whereby in a resting condition the spring is tightened around said pin to prevent a rotation thereof at least in one direction and/or an axial movement in any direction, wherein means are provided for causing an unwinding of the turns of the spring for enabling a rotation and/or an axial movement of the pin;

wherein said means for causing the unwinding of the turns of the spring are shape memory actuating means: and wherein said shape memory means comprises a shape memory wire arranged through an axial cavity of the pin and having one end connected to the pin and the opposite end connected to a slidable actuating element for causing a loosening of the turns of said coil spring as a result of a reduction in length of said shape memory wire caused by the overcoming of the transition temperature of the shape memory material forming the wire.

2. The locking device according to claim 1, wherein said shape memory means are electrically operable.

3. The locking device according to claim 1, wherein the shape memory actuating means comprises an actuator with a wound shape memory element.

4. The locking device according to claim 1, wherein said coil spring presents one end opposite to the end connected to the support structure defining a shank engaged in a helical slit of said slidable actuating element, such that an axial movement of said slidable actuating element causes a rotation of said shank around the axis of the pin, tending to unwind the turns of the coil spring.

5. The locking device according to claim 4, wherein said support structure comprises a casing having a cylindrical body within which said pin is rotatably supported, and said actuating element comprising a cylindrical body slidably mounted with a prismatic coupling within the cylindrical body of the casing.

6. The locking device according to claim 3, further comprising resilient means tending to bring back the actuating element towards a resting position.

7. The locking device according to claim 1, wherein said coil spring prevents, in its resting condition, a rotation of said pin in the direction corresponding to a winding of the turns of the spring.

8. The locking device according to claim 1, wherein in the resting condition of the coil spring, said spring prevents an axial movement of said pin.

9. An articulated lid on-board of a vehicle, for example a compartment lid on a vehicle dashboard, or a lid of the refuel inlet to the tank of the vehicle, supported by a pin associated with a locking device according to claim 1.

10. A sun shade for a vehicle, said shade connected to an articulation pin to which a locking device is associated according to claim 1.

\* \* \* \* \*